United States Patent
Antoni et al.

(10) Patent No.: US 11,232,651 B2
(45) Date of Patent: Jan. 25, 2022

(54) METHOD FOR DETERMINING A PERIOD

(71) Applicant: Continental Teves AG & Co. oHG, Frankfurt (DE)

(72) Inventors: Henrik Antoni, Freigericht (DE); Bernhard Jungk, Ulm (DE)

(73) Assignee: Continental Teves AG & Co. oHG

( * ) Notice: Subject to any disclaimer, the term of this patent is extended or adjusted under 35 U.S.C. 154(b) by 334 days.

(21) Appl. No.: 16/326,515

(22) PCT Filed: Aug. 29, 2017

(86) PCT No.: PCT/DE2017/200085
§ 371 (c)(1),
(2) Date: Feb. 19, 2019

(87) PCT Pub. No.: WO2018/050179
PCT Pub. Date: Mar. 22, 2018

(65) Prior Publication Data
US 2019/0206153 A1    Jul. 4, 2019

(30) Foreign Application Priority Data
Sep. 16, 2016    (DE) ..................... 10 2016 217 811.3

(51) Int. Cl.
| | |
|---|---|
| G07C 5/04 | (2006.01) |
| G04F 10/00 | (2006.01) |
| G07C 5/00 | (2006.01) |
| G04R 20/00 | (2013.01) |
| H04W 4/44 | (2018.01) |
| H04W 4/46 | (2018.01) |
| G06F 1/14 | (2006.01) |

(52) U.S. Cl.
CPC ............... *G07C 5/04* (2013.01); *G04F 10/00* (2013.01); *G04R 20/00* (2013.01); *G07C 5/00* (2013.01); *H04W 4/44* (2018.02); *H04W 4/46* (2018.02); *G06F 1/14* (2013.01)

(58) Field of Classification Search
None
See application file for complete search history.

(56) References Cited

U.S. PATENT DOCUMENTS

| | | | |
|---|---|---|---|
| 5,319,374 A | * | 6/1994 | Desai .................... G01S 19/23 342/357.43 |
| 7,463,981 B2 | | 12/2008 | Weis et al. |
| 9,461,762 B2 | | 10/2016 | Stählin |
| 9,736,801 B1 | * | 8/2017 | Lambert .......... H04W 56/0015 |
| 10,585,401 B2 | | 3/2020 | El-Fotouh |

(Continued)

FOREIGN PATENT DOCUMENTS

| | | |
|---|---|---|
| CN | 101099320 A | 1/2008 |
| CN | 102729821 A | 10/2012 |

(Continued)

OTHER PUBLICATIONS

Chinese Office Action for Chinese Application No. 201780057161. 6, dated Sep. 24, 2020, with translation, 19 pages.

(Continued)

*Primary Examiner* — Arleen M Vazquez
*Assistant Examiner* — Terence E Stifter, Jr.
(74) *Attorney, Agent, or Firm* — RatnerPrestia

(57) ABSTRACT

A method for determining a period in a vehicle using several time sources.

17 Claims, 2 Drawing Sheets

(56) References Cited

U.S. PATENT DOCUMENTS

| | | | |
|---|---|---|---|
| 2009/0222589 A1* | 9/2009 | Kirsch | H04J 3/0676 |
| | | | 709/248 |
| 2015/0154814 A1* | 6/2015 | Kalinadhabhotla | G07C 5/008 |
| | | | 701/31.5 |
| 2016/0208906 A1 | 7/2016 | Hechler et al. | |
| 2016/0357159 A1* | 12/2016 | El-Fotouh | G04G 7/00 |
| 2017/0280416 A1 | 9/2017 | Zalewski et al. | |
| 2018/0335523 A1* | 11/2018 | Namineni | G06F 1/14 |

FOREIGN PATENT DOCUMENTS

| | | |
|---|---|---|
| CN | 104375414 A | 2/2015 |
| DE | 10308232 A1 | 9/2004 |
| DE | 102011007132 A1 | 10/2012 |
| DE | 102013212106 A1 | 1/2015 |
| DE | 102013221321 A1 | 4/2015 |
| DE | 102014203059 A1 | 8/2015 |
| DE | 102014208266 A1 | 11/2015 |
| WO | 2014027072 A1 | 2/2014 |

OTHER PUBLICATIONS

German Search Report for German Application No. 10 2016 217 811.3, with partial translation, dated Jul. 13, 2017—8 pages.
International Search Report and Written Opinion for Application No. PCT/DE2017/200085, dated Nov. 20, 2017—8 pages.

* cited by examiner

METHOD FOR DETERMINING A PERIOD

CROSS REFERENCE TO RELATED APPLICATIONS

This application is the U.S. National Phase Application of PCT International Application No. PCT/DE2017/200085, filed Aug. 29, 2017, which claims priority to German Patent Application No. 10 2016 217 811.3, filed Sep. 16, 2016, the contents of such applications being incorporated by reference herein.

FIELD OF THE INVENTION

The invention relates to a method for determining a period in a vehicle.

BACKGROUND OF THE INVENTION

Vehicle-to-X communication used in vehicles is currently being standardized and rolled out. This is associated with the fact that vehicles will exchange data with one another substantially more frequently in future than at present. It is particularly important that a dependable time is provided as the basis of functions in vehicles and their communication with one another so that algorithms make decisions on the basis of current information.

In this case, it is in principle to be assumed that a permanent power supply cannot typically be supplied and therefore a real-time clock cannot be operated during a period without a power supply. For example, such power failures can occur during workshop stays or when the ignition is switched off.

In the case of a vehicle-to-X system, for example, position and status information of other vehicles is received, evaluated and—in the first generation—driver warnings are produced. In subsequent generations, interventions are also made in the driving dynamics on the basis of received messages. In addition to these applications, it is also helpful to know the time in order to examine the validity of available ephemeris data of the navigation systems used (GNSS=Global Navigation Satellite System), in order to check the usability thereof.

A current time can, in principle, be determined from satellite navigation signals in order to check the plausibility of information and to select currently valid certificates. However, these signals are not permanently available and there is also a risk of the received data being falsified by multiple reflections or deliberately manipulated by a malicious attacker.

SUMMARY OF THE INVENTION

Therefore, an aspect of the invention is to provide a period in a vehicle in an alternative manner, for example more securely, more precisely and/or less expensively.

An aspect of the invention relates to a method for determining a period in a vehicle, which has the following steps:
Receipt of a quantity of time information from, in each case, a time source external to the vehicle, wherein a respective time source confidence measure is assigned to each time source,
establishment of the period based on the time information, and
establishment of a total confidence measure assigned to the period based on the time source confidence measure.

A period can be determined by means of the method according to an aspect of the invention from a number of time sources, that is to say for example from one time source or, in particular, from a plurality of time sources, wherein a total confidence measure is also made available which indicates the reliability of the determined period. In particular, when using a plurality of time information, that is to say for example, two, three, four or more pieces of time information from different time sources in each case, it is in this way possible to eliminate any errors of individual time sources and to obtain a time basis which is trustworthy overall.

According to respective embodiments, the time information is received from time sources which are selected from the following group:
infrastructure facilities, in particular roadside units,
other vehicles,
special operations vehicles,
backend systems,
intelligent transport systems (ITS),
radio-controlled clocks,
public key infrastructure systems,
satellites,
mobile network.

It should be understood that any combination of these indicated time sources or other time sources can be combined with one another in any way desired. All of the relevant combinations are deemed to form part of the disclosure of this application.

Infrastructure facilities such as roadside units are very reliable, but are only rarely available. It is true that other vehicles are very frequently to be found on roads, but they are rather prone to errors or manipulation. Special operations vehicles are typically reliable since these are official vehicles, but these are also only very rarely available.

It is true that backend systems and intelligent transport systems are reliable in principle, but they are not always implemented or available.

Radio-controlled clocks are very precise and their signals can also be received over a wide area, however they are prone to certain manipulations, as their signals are poorly or only weakly encrypted. Satellite signals are not available everywhere, for example in tunnels or in buildings and, in addition, are prone to multiple reflections and other effects.

A real-time clock inside the vehicle can also be used as the time source. It is true that real-time clocks inside the vehicle are a reliable internal time source, however they may not be able to operate permanently in the event of a power failure. It should be understood that a real-time clock inside a vehicle can be typically deemed to be implemented internally in the vehicle, which does not however adversely affect the usability within the framework of the method described herein. It can be used in the same way as external time sources and can have a time source confidence measure.

The time information is advantageously weighted during the establishment of the period. Therefore, particularly trustworthy and/or reliable and/or accurate time sources can have a higher weighting than other time sources.

In this case, the weighting given to a piece of time information can in particular be all the higher, the higher the respective time source confidence measure of the time source is from which the time information was received.

A respective time source confidence measure can in particular be indicative of the accuracy and/or the reliability of the respective time source. The time source confidence measure can thus, for example, indicate only the accuracy, only the reliability or both the accuracy and the reliability.

In particular, in the latter case, both a total measure for accuracy and reliability can be produced, or separate values for accuracy and reliability can be included in the respective time source confidence measure. In particular, in the latter case, respective thresholds can have for example two components, that is to say one component for the accuracy and one component for the reliability, or the values for accuracy and for reliability can, for example, be added or otherwise pooled and compared with a single threshold.

According to one further development, a deviation between the time information is additionally determined. The total confidence measure can, in this case, be additionally established based on the deviation. In the event of a particularly high deviation which points to unreliable time sources, the total confidence measure can consequently in particular be lowered, in order to possibly be able to warn applications that the determined period is not reliable.

According to one preferred embodiment, an examination is activated in response to the deviation exceeding a prescribed threshold. As a result, any errors in the system or with the time sources can be found by the examination and, if necessary, eliminated or taken into consideration.

In particular, one time source from a plurality of time sources can be wholly or partially ignored if the time information supplied by it deviates from the time information of other time sources in a specific way, for example by more than a prescribed absolute or relative threshold. To this end, for example, the mean of the time information of other time sources can be taken for example.

An enquiry regarding the current time can also be made to a backend, in particular if too large deviations exist between the time information supplied by different time sources, for example if they differ from one another by more than an absolute or relative threshold.

According to one preferred embodiment, failure periods based on different time sources are compared with one another following a failure of a system implementing the method. If a deviation between the failure periods exceeds a threshold, it is ascertained that the period established is unreliable. It is therefore possible to avoid initializing systems with unreliable or inaccurate periods. In this case, the failure period can be determined in each case separately for each time source, so that a comparison is easily possible.

According to one further development of an aspect of the invention, a continual measure of time is advanced by an oscillator, wherein the measure of time is updated by means of the established period. In this case, such an oscillator can in particular advance a measure of time which is, for example, executed as a counter, incrementer or as a clock. This makes it possible to implement a real-time clock in a controlled manner, taking the boundary conditions discussed here into consideration.

According to one embodiment, it is provided that the measure of time is only updated if the total confidence measure of the period exceeds a predetermined threshold. The use of periods which are not trustworthy in order to update the measure of time can therefore be advantageously prevented.

The measure of time can in particular be updated at prescribed intervals and/or after prescribed events, in particular a power failure. This allows the measure of time to be updated by means of the method described herein at sensible points in time.

The measure of time is preferably implemented such that it can exclusively be amended to later periods. This therefore prevents a possible attacker setting the measure of time to a value which has actually already passed, by means of messages which suggest an earlier period. This can therefore, for example, prevent the vehicle considering vehicle-to-X messages to still be valid which, in reality, are no longer valid at all, as a result of such an attack.

According to one preferred embodiment, in the event of a system administering the measure of time dropping out, the measure of time and/or a quantity of periods is/are stored. The failure periods indicated above can therefore be calculated, for example. In addition, a start value can be prescribed which, when the system is switched on, cannot fall short of the period.

According to one preferred embodiment, the measure of time is not used for prescribed tasks until after an update or after a prescribed minimum number of updates. This can ensure that the measure of time is not used for safety-critical applications until it has been updated such that it is reliable.

A clock, which is based on satellite navigation signals, can for example be implemented in a vehicle. By virtue of the reduced availability, but first and foremost also due to the manipulability, this time is not sufficiently suitable for a driver warning or even an intervention in the driving dynamics. Due to gaps in the availability of a power supply, it is not possible to have recourse to internal clocks in the form in which they have already been partially implemented in components for satellite navigation or a hardware security module.

As already described above and now explained again, various time sources can be enlisted within the framework of aspects of the invention or for referencing.

A high level of trustworthiness can be assumed of roadside units which form part of the infrastructure. Admittedly, these units are only few and far between.

Special operations vehicles can likewise be deemed to be a trustworthy time source, but are likewise only few and far between in their application.

Other vehicle-to-X subscribers are extensively available following an introduction phase, but do not offer a high degree of trustworthiness individually. The trustworthiness can be increased by multiple subscribers.

Backend-based ITS systems (intelligent transport systems) can also provide a time, whereby the trustworthiness thereof is also only limited. The trustworthiness can be increased by secure communication.

Radio-controlled clock signals can typically be received with an existing antenna. This time is deemed to be particularly accurate, although no security safeguards are provided with these signals either.

In addition to the requirement for pseudonym certificates, communication with a public key infrastructure (PKI) can likewise be used in order to safely request a time. To this end, data communication is admittedly required during operation.

A real-time clock (RTC) inside the vehicle would offer a high degree of trustworthiness, although it cannot be assumed that vehicles will accordingly be available in a timely manner and with a high adoption rate.

Consequently, it is typically not possible to generate an accurate and secure period from one time source.

In order to nevertheless achieve a sufficiently secure and sufficiently accurate time, a combination of the available sources is selected according to one possible embodiment of the invention. These sources preferably obtain a trustworthiness index or respectively a time source confidence measure, in order to represent the dependability of the information, and an accuracy index which can reflect the accuracy of the period. The total of the combined indices then provides information about the reliability of the information and a—mathematically based—decision can be made.

The accuracy or deviations can in particular be examined in the vehicle, but this can also be effected for example in a backend. A backend can in particular be a server or other infrastructure which can be accessed by means of radio communication, for example vehicle-to-X communication or mobile radio.

In addition to the reliability indices, a temporal deviation of the sources from one another can also be taken into consideration. If the information from one source is outside the expected tolerance for internal reference, a check is advantageously initiated and all of the available sources are interrogated. Additional enquiries can also be made, for example of the public key infrastructure.

In addition to these comparison possibilities, the time can also be permanently checked. In the process, a timeline can be assumed which can be advanced by an internal oscillator. A dependable time is preferably not communicated until a sufficient data base is available. Each further piece of information containing the time is compared with the timeline and the deviation is calculated. If a sufficient number of pieces of time information and/or sufficiently accurate time information is/are available, the timeline is advantageously tracked. When the system is switched off the last value of the timeline can be stored; a storage of the last reference times can likewise be helpful, in order to compare the "sleep times" of multiple sources with one another. If the system is subsequently woken, for example, the various sleep times are firstly determined and compared. Here as well, a decision based on mathematical rules can, in turn, be made regarding the confidence.

However, a comparison of the deviations in the information can also result in the devaluation of the totalized dependability. If the totalized dependability falls below a specific predefined bound, this can for example signal that the time source is no longer dependable and a relevant replacement measure has to be initiated.

Furthermore, an aspect of the invention relates to a system or a control module which is configured to execute a method according to an aspect of the invention. Furthermore, an aspect of the invention relates to a non-volatile computer-readable storage medium, on which programming code is stored, during the running of which code a computer executes a method according to an aspect of the invention. With respect to the method according to an aspect of the invention, recourse can, in this case, be had in each case to all of the described embodiments and variants.

BRIEF DESCRIPTION OF THE DRAWINGS

The person skilled in the art will infer further features and advantages from the embodiment example described below with respect to the appended drawing, wherein.

DETAILED DESCRIPTION OF THE PREFERRED EMBODIMENTS

Figure 1:
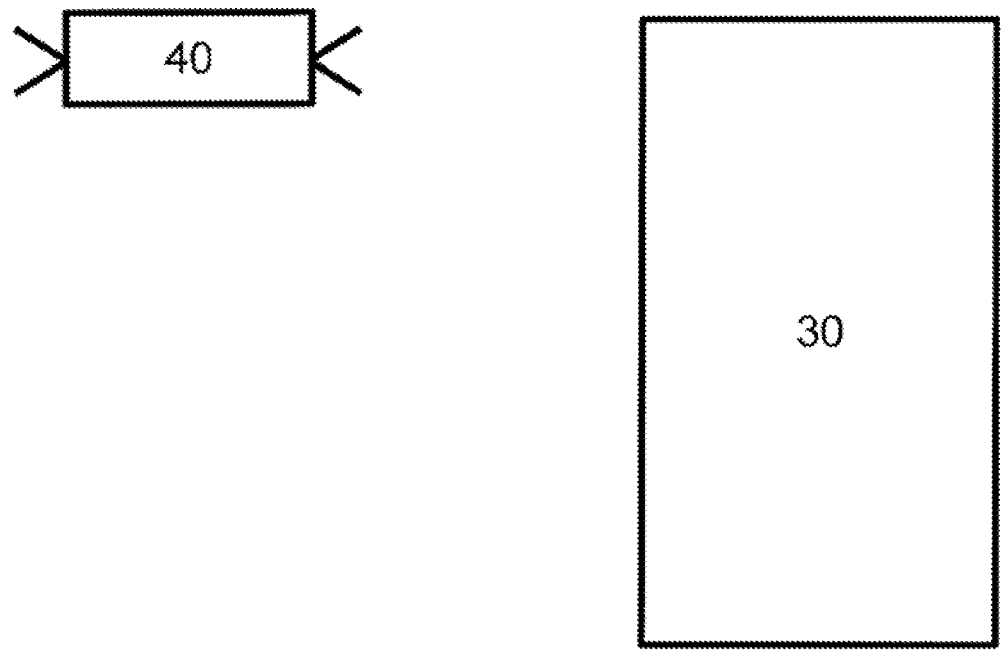
FIG. 1 shows a vehicle which is configured to execute a method according to an aspect of the invention.
Figure 1:
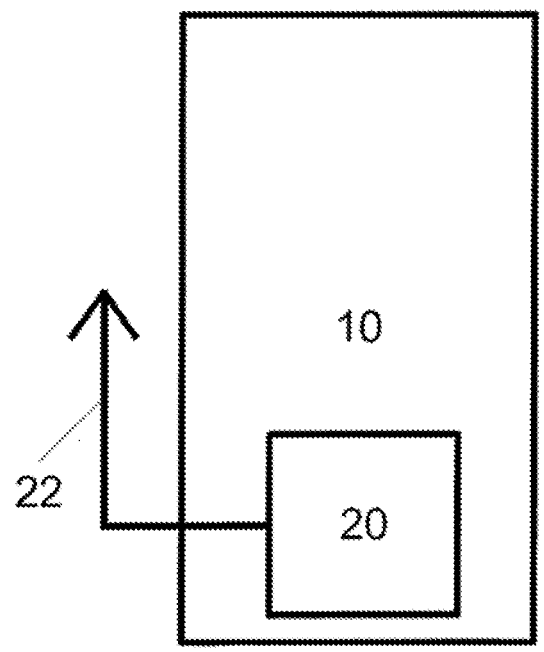

FIG. 1 shows a vehicle 10 which is merely represented schematically here. The vehicle 10 has a control module 20 which is configured to perform one possible embodiment of a method according to an aspect of the invention. The control module 20 is also merely schematically represented here.

The vehicle 10 has an antenna 22 which can receive a variety of signals. The antenna 22 is connected to the control module 20 as shown.

In the present embodiment, vehicle-to-X messages are in particular received by means of the antenna 22, which vehicle-to-X messages can originate for example from a further vehicle 30 which is also merely represented schematically and by way of example. Furthermore, satellite navigation signals are received, which can originate for example from a satellite 40 which is merely represented schematically and by way of example.

Both vehicle-to-X messages and satellite navigation signals contain time information. The control module 20 uses this time information and determines a combined measure of time therewith, which is effected in the form of weighted averaging. The time sources, that is to say the further vehicle 30 and the satellite 40 here, are in this case weighted with regard to their reliability and accuracy. This means that an overall more reliable measure of time can be obtained overall than when only one time source is used.

Furthermore, a deviation between the periods supplied by the two time sources is constantly established. In the event that these exceed a specific value, an error search procedure is activated, which searches for errors in the system or with the time sources. In the event of a corresponding deviation, the use of the determined period can, for example, be temporarily suspended for critical applications.

A continual measure of time, which is advanced by an oscillator, is further implemented in the control module 20. The measure of time is implemented such that it can only be advanced towards later periods. In the event of a power failure, this measure of time remains at its last value prior to the power failure. Following the power failure, it is advanced further by the oscillator. If a sufficiently reliable period has been established, as has just been described, the measure of time is updated so that the period of the power failure is bridged therewith until such time as a current measure of time is available again. The described implementation prevents a rewinding of the measure of time so that attackers cannot lead the vehicle 10 to think that the period is earlier than it actually is by means of compromised messages. In this way, attacks involving vehicle-to-X messages being recorded and sent out, simulating an incorrect period, at later points in time and being identified as valid messages, are impeded.

Figure 2:
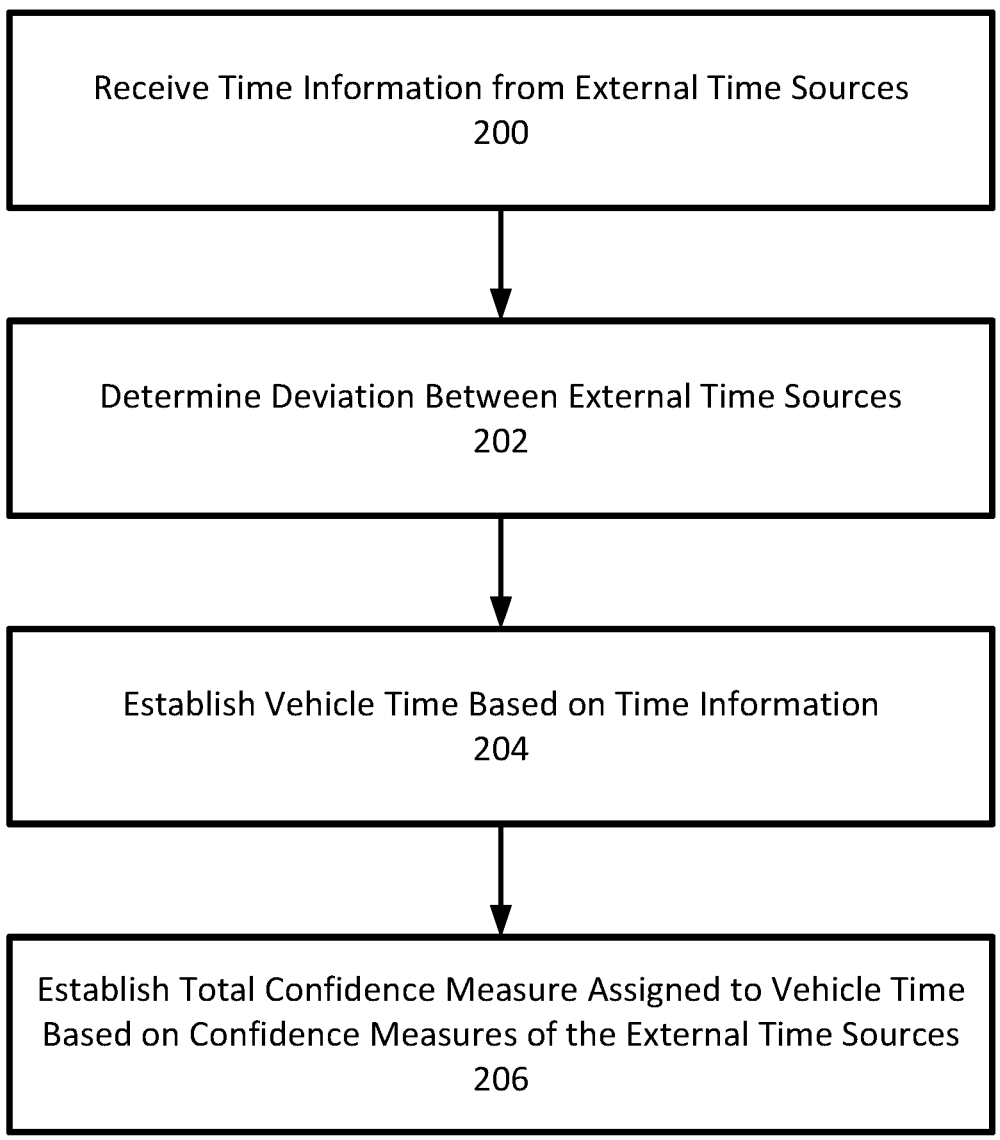
FIG. 2 shows a flowchart of a method for establishing vehicle time according to an aspect of the invention.

FIG. 2 shows a flowchart of a method for establishing vehicle time according to an aspect of the invention. In step 200, the vehicle receives time information from a plurality of external time sources. In step 202, the vehicle determines a deviation between the time information of the time sources. In step 204, the vehicle establishes a vehicle time based on the time information. In step 206, the vehicle establishes a total confidence measure assigned to the vehicle time based on the confidence measures of the time sources.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). Aspects of the invention expressly do not, however, exclude vehicle-to-X communication with the intermediary of, for example, a mobile network.

The indicated steps of the method according to an aspect of the invention can be executed in the indicated order. They can, however, also be executed in another order. The method according to an aspect of the invention can be executed in one of its embodiments, for example with a specific combination of steps, such that no further steps are executed. However, further steps can essentially also be executed, including those which are not indicated.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the FIGURES, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

The invention claimed is:

1. A method for determining a vehicle time in a vehicle, comprising:
    operating the vehicle based on the vehicle time which is advanced by an oscillator,
    receiving a quantity of time information from a plurality of time sources external to the vehicle, wherein a respective time source confidence measure is assigned to each of the plurality of time sources,
    determining a respective deviation between the time information of each of the plurality of time sources,
    establishing a total confidence measure based on the time source confidence measures and the respective deviation between the time information of each of the plurality of time sources,
    maintaining the vehicle time based on the oscillator when the total confidence measure is less than a confidence threshold, and suspending use of the vehicle time by an application executed by the vehicle, and
    updating the vehicle time based on the time information of each of the plurality of time sources when the total confidence measure is greater than the confidence threshold, and resuming use of the updated vehicle time by the application executed by the vehicle.

2. The method according to claim 1,
    wherein the time information is received from time sources which are selected from the group consisting of:
    infrastructure facilities,
    in particular roadside units,
    other vehicles,
    special operations vehicles,
    backend systems,
    intelligent transport systems,
    radio-controlled clocks,
    public key infrastructure systems,
    satellites, and
    a mobile network.

3. The method according to claim 2, wherein the time information is weighted during the establishment of the vehicle time.

4. The method according to claim 1,
    wherein the time information is weighted during the establishment of the vehicle time.

5. The method according to claim 4,
    wherein the weighting increases as the confidence measure of the time source increases.

6. The method according to claim 1,
    wherein a respective time source confidence measure is indicative of the accuracy and/or the reliability of the respective time source.

7. The method according to claim 1,
    wherein an examination is activated in response to the respective deviation exceeding a prescribed threshold.

8. The method according to claim 1,
    wherein durations of failure periods when time information is not received from different time sources are compared with one another following a failure to establish the vehicle time,
    wherein, when a deviation between the durations of the failure periods exceeds a threshold, it is ascertained that the vehicle time established is unreliable.

9. The method according to claim 1, wherein an examination is activated in response to the respective deviation exceeding a prescribed threshold.

10. The method according to claim 1,
    in which a continual measure of vehicle time is additionally advanced by an oscillator,
    wherein the measure of vehicle time is updated by the established vehicle time.

11. The method according to claim 10,
    wherein the measure of vehicle time is only updated if the total confidence measure of the vehicle time exceeds a predetermined threshold.

12. The method according to claim 11, wherein the measure of vehicle time is updated at prescribed intervals and/or after prescribed events.

13. The method according to claim 10,
    wherein the measure of vehicle time is updated at prescribed intervals and/or after prescribed events.

14. The method according to claim 10,
wherein the measure of vehicle time is implemented such that it can exclusively be amended to be advanced.

15. The method according to claim 10,
wherein, in the event of a system administering the measure of vehicle time being switched off, the measure of vehicle time is stored.

16. The method according to claim 10,
wherein the measure of vehicle time is not used for prescribed tasks until after an update or after a prescribed minimum number of updates.

17. The method according to claim 10, wherein the measure of vehicle time is updated at prescribed intervals and/or after a power failure.

* * * * *